United States Patent
Meingast et al.

(10) Patent No.: US 11,014,617 B2
(45) Date of Patent: May 25, 2021

(54) VEHICLE BED SIDE WALL CONFIGURED FOR VERTICAL LOAD SUPPORT

(71) Applicant: Toyota Motor Engineering & Manufacturing North America, Inc., Plano, TX (US)

(72) Inventors: Herbert Meingast, Ann Arbor, MI (US); Matthew A. Jansma, Saline, MI (US); Wei Jiang, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 83 days.

(21) Appl. No.: 16/421,768

(22) Filed: May 24, 2019

(65) Prior Publication Data

US 2020/0369198 A1    Nov. 26, 2020

(51) Int. Cl.
| | | |
|---|---|---|
| *B62D 33/023* | (2006.01) | |
| *B60P 7/08* | (2006.01) | |
| *B60R 9/06* | (2006.01) | |

(52) U.S. Cl.
CPC .......... *B62D 33/023* (2013.01); *B60P 7/0807* (2013.01); *B60P 7/0815* (2013.01); *B60R 9/06* (2013.01); *B60Y 2200/141* (2013.01)

(58) Field of Classification Search
CPC ........ B60P 7/0807; B60P 7/0815; B60R 9/06; B62D 33/023
USPC .............................................. 296/37.6, 183.1
See application file for complete search history.

(56) References Cited

U.S. PATENT DOCUMENTS

| | | | |
|---|---|---|---|
| 5,882,058 A | 3/1999 | Karrer | |
| 6,024,402 A | 2/2000 | Wheatley | |
| 7,152,910 B2 * | 12/2006 | Kikuchi | B60P 7/0815 296/183.1 |
| 7,455,349 B2 * | 11/2008 | Kikuchi | B60P 7/0815 296/181.3 |
| 8,348,331 B2 * | 1/2013 | Holt | B60R 9/00 296/183.1 |
| 9,975,501 B1 | 5/2018 | Frederick et al. | |
| 10,259,509 B2 * | 4/2019 | Marchlewski | B62D 33/023 |
| 2005/0040670 A1 | 2/2005 | Kikuchi et al. | |
| 2007/0110539 A1 | 5/2007 | Klinkman et al. | |
| 2007/0132278 A1 * | 6/2007 | Lester | B62D 29/048 296/191 |
| 2008/0231075 A1 * | 9/2008 | Plavetich | B60P 7/0815 296/183.1 |
| 2019/0126994 A1 * | 5/2019 | Brown | B62D 33/0207 |

* cited by examiner

*Primary Examiner* — Jason S Daniels

(74) *Attorney, Agent, or Firm* — Christopher G. Darrow; Darrow Mustafa PC

(57) ABSTRACT

A side wall of a vehicle bed can be configured to provide support against vertical loads, such as step loading, imposed on a lateral side wall of the bed. The bed can be defined in part by a first lateral side wall and a second lateral side wall. The first and/or second lateral side wall can include an inner wall member, an outer wall member, and a top protector. The top protector can being operatively connected to the inner and outer wall members. The top protector can define a top surface of the respective lateral side wall. The inner wall member can include a transverse portion that extends to an innermost end. The innermost end can be substantially adjacent to an inner side of the top protector. Thus, the inner and outer wall members can support the top protector across substantially its entire width.

10 Claims, 3 Drawing Sheets

VEHICLE BED SIDE WALL CONFIGURED FOR VERTICAL LOAD SUPPORT

FIELD

The subject matter described herein relates in general to vehicles and, more particularly, to vehicle cargo areas.

BACKGROUND

Some motor vehicles have storage spaces located behind a passenger seating area. For example, pick-up trucks are motor vehicles with a rear open top cargo area, which is commonly referred to as a bed, located behind a passenger cabin. The bed allows the vehicle to be utilized in many different ways, including carrying or storing various types of cargo (e.g., tools, groceries, sporting equipment, etc.). Some beds can include features to facilitate the securing and/or transport of cargo loaded within the bed, such as tie down members and accessory rails.

SUMMARY

In one respect, the present disclosure is directed to a vehicle. The vehicle can include a bed. The bed can be defined in part by a first lateral side wall and a second lateral side wall. The first lateral side wall can be spaced from and opposite to the second lateral side wall. The first lateral side wall and/or the second lateral side wall can include an inner wall member, an outer wall member, and a top protector. The top protector can be operatively connected to the inner wall member and the outer wall member. The top protector can define a top surface of the first lateral side wall or the second lateral side wall. The inner wall member can include a transverse portion. The transverse portion can include an innermost end. The innermost end can be substantially adjacent to an inner side of the top protector. The inner wall member and outer wall member can provide support across a width of the top surface with respect to vertical loads.

DETAILED DESCRIPTION

In some vehicle beds, a top protector of a lateral side wall may not have underlying support in some areas. As a result, when the top protector is subject to a vertical loads (e.g., step loading) over time, the top protector may eventually become damaged in these unsupported areas. Accordingly, arrangements described herein are directed to providing support to the top protector across substantially its entire width. As a result, the top protector is able to withstand vertical loading. Further, arrangements described are also directed to an accessory rail formed together with an inner wall member of the lateral side wall. As a result, a separate attachment element can be eliminated while increasing the strength of the accessory rail.

Figure 2:
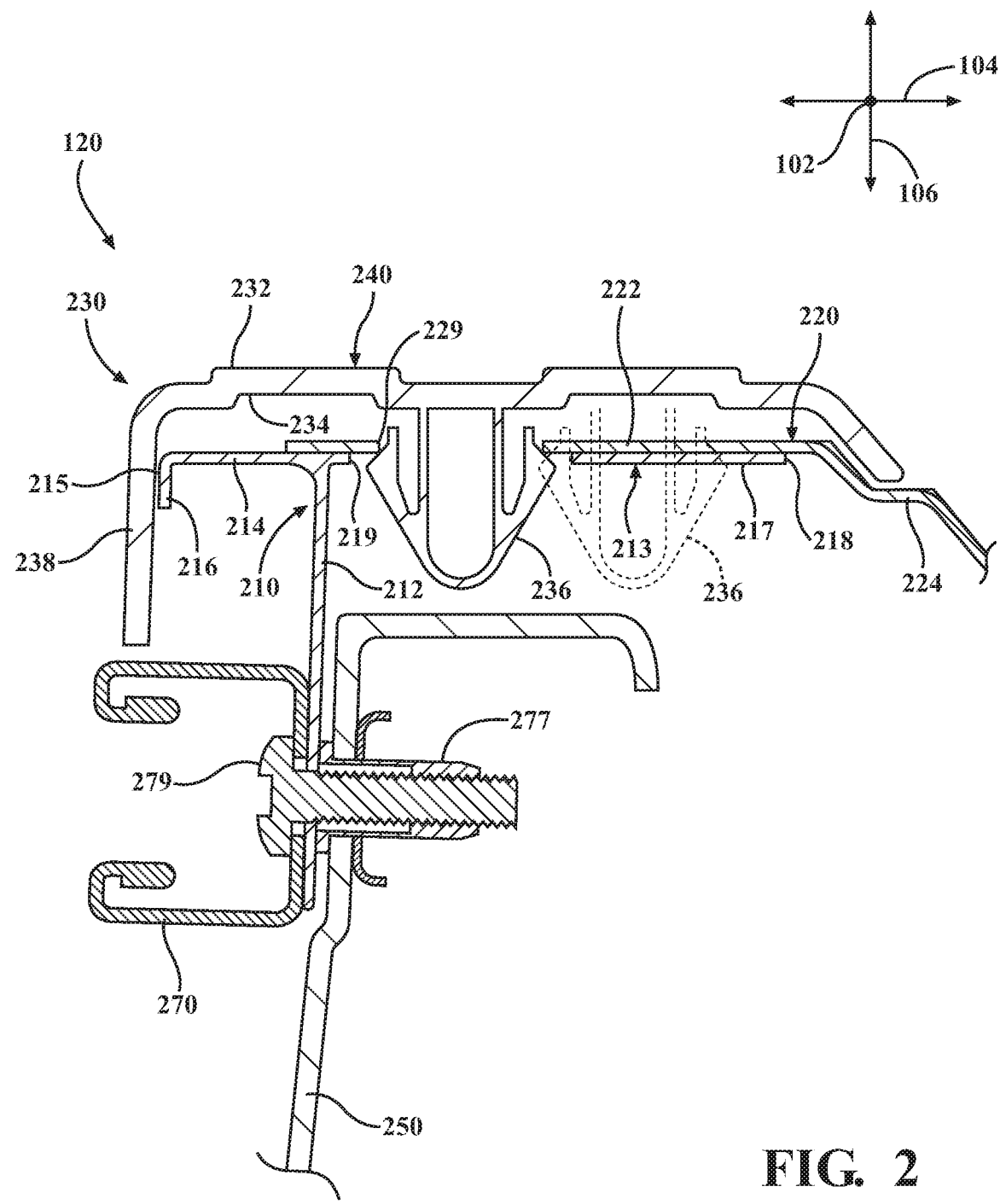
FIG. 2 is a cross-sectional view of a lateral side wall of the bed, viewed along line X-X in FIG. 1.
Figure 3:
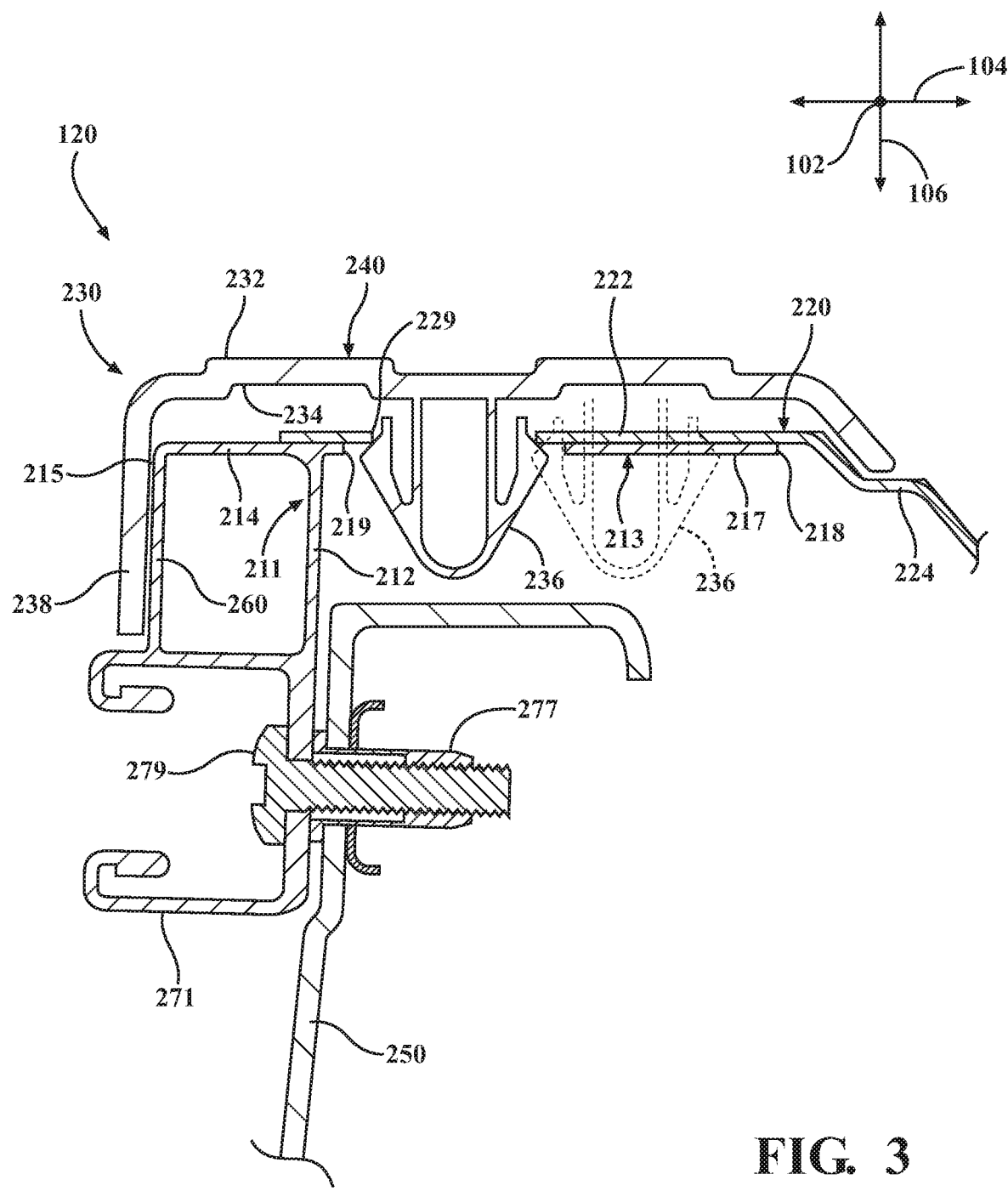
FIG. 3 is a cross-sectional view of the lateral side wall of the bed, viewed along line X-X in FIG. 1, showing an inner wall member and an accessory rail formed as a unitary structure.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-3, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Figure 1:
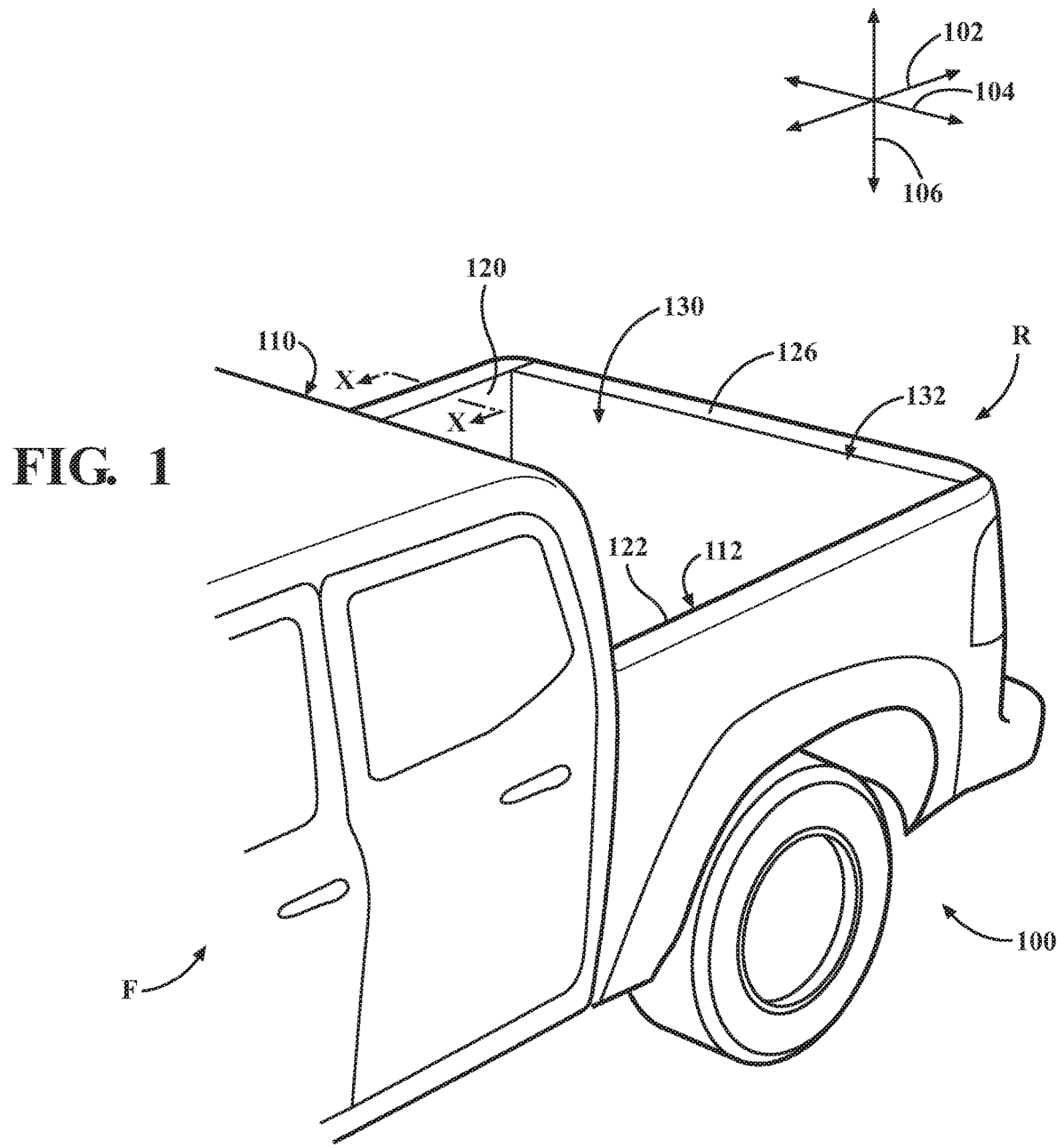
FIG. 1 is an example of a portion of a vehicle including a cabin and a bed.

FIG. 1 shows an example of a portion of a vehicle 100. As used herein, "vehicle" means any form of motorized transport. In one or more implementations, the vehicle 100 can be a pick-up truck or a sport utility vehicle. While arrangements will be described herein with respect to a pick-up truck, it will be understood that embodiments are not limited to pick-up trucks.

The vehicle 100 can include a forward end F and a rearward end R. The vehicle 100 can have an associated longitudinal direction 102. The longitudinal direction 102 can generally correspond to the forward-rearward direction of the vehicle 100. The vehicle 100 can have an associated lateral direction 104, which can be substantially perpendicular to the longitudinal direction 102. The lateral direction 104 can generally correspond to the left-right direction of the vehicle 100. The vehicle 100 can have an associated elevational direction 106. The elevational direction 106 can be substantially perpendicular to the longitudinal direction 102 as well as the lateral direction 104. The elevational direction 106 can generally correspond to the top-bottom direction of the vehicle 100.

The vehicle 100 can include a cabin 110 and a bed 112. The cabin 110 and the bed 112 can be substantially proximate to each other. The cabin 110 can be a compartment or seating area for passengers. The bed 112 can allow the vehicle 100 to be utilized in many different ways, including carrying or storing various types of cargo (e.g., tools, groceries, sporting equipment, etc.).

The bed 112 can be defined at least in part by a floor (not visible in FIG. 1), a first lateral side wall 120, a second lateral side wall 122, a forward wall (not visible in FIG. 1), and a back wall 126. In some arrangements, the back wall 126 can be defined by a tailgate. The bed 112 can define a space 130 that is substantially rectangular. A top 132 of the bed 112 can be open. In some instances, the top 132 of the bed 112 can be at least partially closed by a tonneau cover, topper, or other element.

The first lateral side wall 120 can be spaced from and opposite to the second lateral side wall 122. The first lateral side wall 120 and the second lateral side wall 122 can be substantially parallel to each other. The forward wall and the back wall 126 can be substantially parallel to each other.

The first lateral side wall 120 and/or the second lateral side wall 122 can be configured to provide support against vertical loads (e.g., step loading.). FIG. 2 is a cross-sectional view of the first lateral side wall 120, viewed along line X-X in FIG. 1. The first lateral side wall 120 can include an inner wall member 210, an outer wall member 220, and a top protector 230. The terms "inner" and "outer" are used for convenience to note the relative location of these structures to the bed 112. In some instances, the inner wall member 210 may be referred to as a deck side inner, and the outer wall member 220 may be referred to as a deck side outer.

The inner wall member 210 can be operatively connected to a structure 250, which can define at least in part the floor of the bed 112. The structure 250 may also form a portion of the respective lateral side wall 120, 122. The structure 250 can be made of any suitable material, such as resin or metal.

The inner wall member 210 can be made of any suitable material, such as aluminum. The inner wall member 210 can be made in any suitable manner. For instance, the inner wall member 210 can be made by extrusion.

The inner wall member 210 can have any suitable size, shape, and/or configuration. The size, shape, and/or configurations of the inner wall member 210 overall and any of its individual portions can be configured to achieve the desired performance characteristics. In one or more arrangements, the inner wall member 210 can be substantially t-shaped in cross-section, as is shown in FIG. 2.

In one or more arrangements, the inner wall member 210 can include a central portion 212. The central portion 212 can be elongated. The central portion 212 can extend substantially vertically, that is, substantially in the elevational direction 106 of the vehicle 100. The central portion 212 can be substantially straight. However, in some arrangements, the central portion 212 can have one or more non-straight features, such as bends, curves, steps, etc.

The inner wall member 210 can include a transverse portion 213. The transverse portion 213 can be substantially perpendicular to the central portion 212. The transverse portion 213 can be substantially straight. The transverse portion 213 can be substantially covered by the top protector 230.

The transverse portion 213 can include an innermost end 215 and an outermost end 218. In one or more arrangements, the innermost end 215 can include a lip 216. The lip 216 can extend generally downwardly in the elevational direction 106. The lip 216 can extend at substantially 90 degrees relative to the rest of the transverse portion 213.

The transverse portion 213 can include an inner portion 214 and an outer portion 217. The inner portion 214 can extend away from the central portion 212 and toward the bed 112 in the lateral direction 104. The outer portion 217 can extend away from the central portion 212 and away from the bed 112 in the lateral direction 104. The inner portion 214 can have a length, and the outer portion 217 can have a length. In one or more arrangements, the length of the inner portion 214 can be less than the length of the outer portion 217. In one or more arrangements, the outer portion 217 can include one or more apertures 219. When installed on the vehicle 100, the inner wall member 210 may not be visible to a user.

The outer wall member 220 can include an inner portion 222 and an outer portion 224. The terms "inner" and "outer" are used for convenience to note the relative location of these structures to the bed 112. The inner portion 222 can be substantially straight. The inner portion 222 can be substantially covered by the top protector 230. The outer portion 224 can extend laterally outboard of the top protector 230. The outer portion 224 can define an outer body panel of the vehicle, such as a fender.

The outer wall member 220 can be made of any suitable material, such as aluminum. In one or more arrangements, the outer wall member 220 and the inner wall member 210 can be made of the same material, or they can be made of different materials. The outer wall member 220 can be made in any suitable manner. For instance, the outer wall member 220 can be made by extrusion. In one or more arrangements, the inner portion 222 can include one or more apertures 229.

The top protector 230 can provide protection to the components of the first lateral side wall 120 or the second lateral side wall 122. The top protector 230 can also minimize the infiltration of undesired substances into spaces within the first lateral side wall 120 or the second lateral side wall 122. The top protector 230 can also serve as a garnish, providing a more stylish and/or aesthetically pleasing appearance. The top protector 230 can be made of any suitable material, such as metal, plastic, or other material.

The top protector 230 can have any suitable size, shape, and/or configuration. The top protector 230 can include an outer surface 232 and an inner surface 234. The top protector 230 can define a top surface 240 of the first lateral side wall 120 and/or the second lateral side wall 122 in the elevational direction 106. The top surface 240 can have any suitable configuration. For instance, the top surface 240 can be substantially planar, or the top surface 240 can be non-planar in one or more areas.

The top protector 230 can include a downturn side 238. The downturn side 238 can extend generally downwardly in the elevational direction 106. The downturn side 238 can extend at substantially 90 degrees relative to the top surface 240.

The top protector 230 can be operatively connected to the inner wall member 210 and the outer wall member 220 in any suitable manner, such as one or more fasteners, one or more adhesives, and/or one or more forms of mechanical engagement. For example, the top protector 230 can be operatively connected to the inner wall member 210 and the outer wall member 220 by one or more connectors 236, which can be any type of connector, now known or later developed. In one or more arrangements, the connector 236 can be formed together with the top protector 230 as a unitary structure. In other arrangements, the connector 236 can be a separate component from the top protector 230.

The inner wall member 210 and the outer wall member 220 can be arranged in an overlapping manner. More particularly, the inner portion 222 of the outer wall member 220 can overlap at least a portion of the outer portion 217 of the inner wall member 210. In some instances, the inner portion 222 of the outer wall member 220 can overlap an entire length of the outer portion 217 of the inner wall member 210. Still further, the inner portion 222 of the outer wall member 220 can overlap a portion of the inner portion 214 of the inner wall member 210. In some arrangements, the inner wall member 210 and the outer wall member 220 can be operatively connected to each other in one or more areas of the overlap, such as by spot welding. The aperture(s) 219 in the inner portion 222 of the outer wall member 220 can be substantially aligned with the aperture(s) 229 in the outer portion 217 of the inner wall member 210. The connector 236 can be received in the aligned apertures 219, 229.

When assembled, the laterally innermost end 215 can be substantially adjacent to the inner surface 234 of the top protector 230. More particularly, the laterally innermost end 215 can be substantially adjacent to the inner surface 234 of the top protector 230 at the lip 216. In this context, "substantially adjacent" includes direct contact and slight spacing of about 1 inch or less, 0.5 inch or less, or 0.25 inch or less.

In view of these arrangements, it will be appreciated that the inner wall member 210 and outer wall member 220 can provide support to the top protector 230 across its width in the lateral direction 104. As a result of such arrangements, the top protector 230 can have underlying support when it is subjected to vertical loads (e.g., step loading). Thus, unsupported areas of the top protector 230 relative to such loads can be minimized or eliminated. The inner wall member 210 can also support the outer wall member 220 due to their overlap and connection.

In some arrangements, the first lateral side wall 120 and/or the second lateral side wall 122 can include an accessory rail 270. The accessory rail 270 can extend in the longitudinal direction 102 along the first lateral side wall 120 and/or the second lateral side wall 122. The accessory rail 270 can have any suitable shape or configuration, now known or later developed. In one or more arrangements, the accessory rail 270 can have a substantially c-shaped cross-sectional shape. The accessory rail 270 can be made of any suitable materials, including, for example, metal or plastic.

In one or more arrangements, the accessory rail 270 can be a separate structure from the first lateral side wall 120 and/or the second lateral side wall 122. In such case, the accessory rail 270 can be operatively connected to the inner wall member 210 by one or more fasteners, one or more welds, one or more adhesives, and/or one or more forms of mechanical engagement. In one or more arrangements, the accessory rail 270 can be operatively connected to the inner wall member 210 by one or more blind rivet nuts 277 and studs or bolts 279. In the arrangement shown in FIG. 2, the accessory rail 270 can be operatively connected to the central portion 212 of the inner wall member 210 and to the structure 250. When installed, the accessory rail 270 can be substantially adjacent to the downturn side 238 of the top protector 230. As a result, the accessory rail 270 can provide a bottoming out point for the top protector 230 in instances when the top protector 230 is forced downwardly.

FIG. 3 is a cross-sectional view of the first lateral side wall 120, viewed along line X-X in FIG. 1. The first lateral side wall 120 can include an inner wall member 211, an outer wall member 220, and a top protector 230. The outer wall member 220 and the top protector 230 can be substantially the same as in FIG. 2. Therefore, the above description of these components applies equally here.

However, in the arrangements shown in FIG. 3, an accessory rail 271 and the inner wall member 211 can be formed a unitary structure. Such a structure can be formed in any suitable manner, such as by extrusion. In one or more arrangements, the accessory rail 271 and the inner wall member 211 can be made of aluminum.

It should be noted that the accessory rail 271 can have substantially the same features as the accessory rail 270 in FIG. 2. Alternatively, the accessory rail 271 can be different in one or more respects. Similarly, the inner wall member 211 can have substantially the same features as the inner wall member 210 in FIG. 2 (e.g., the transverse portion 213, the inner portion 214, the outer portion 217, etc.). Alternatively, the accessory rail 271 can be different in one or more respects.

The accessory rail 271 can be connected to the inner wall member 211 in any suitable location. For instance, the accessory rail 271 can extend from the central portion 212 of the inner wall member 211. In addition, the accessory rail 271 can connect to the inner wall member 211 in other locations. For example, as is shown in FIG. 3, the accessory rail 271 and the inner portion 214 of the transverse portion 213 can be joined by a connecting member 260. The connecting member 260 can be substantially adjacent to the inner surface 234 of the downturn side 238 of the top protector 230. However, it will be appreciated that the connecting member 260 can join the accessory rail 271 to other portions of the inner wall member 211.

Overall, it will be appreciated that the arrangements shown in FIG. 3 can provide support for the top protector 230 in substantially the same manner described in connection with FIG. 2. For the particular arrangements shown in FIG. 3, the connecting member 260 can provide further support to top protector 230 when subject to vertical loads.

It will be appreciated that arrangements described herein can provide numerous benefits, including one or more of the benefits mentioned herein. For example, arrangements described herein can provide enhanced support to the top protector, particularly when subjected to vertical/step loads. More particularly, arrangements described herein can provide support to the top protector across its entire width. Moreover, arrangements described herein can provide support to the top protector along an inner portion of the top protector. When a unitary inner wall member and accessory rail is provided, arrangements described herein can eliminate an assembly step and/or an assembly part. Further, arrangements described herein can optimize the strength of the accessory rail/inner wall member while also achieving reduced mass.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The term "or" is intended to mean an inclusive "or" rather than an exclusive "or." The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC). As used herein, the term "substantially" or "about" includes exactly the term it modifies and slight variations therefrom. Thus, the term "substantially parallel" means exactly parallel and slight variations therefrom. "Slight variations therefrom" can include within 15 degrees/percent/units or less, within 14 degrees/percent/units or less, within 13 degrees/percent/units or less, within 12 degrees/percent/units or less, within 11 degrees/percent/units or less, within 10 degrees/percent/units or less, within 9 degrees/percent/units or less, within 8 degrees/percent/units or less, within 7 degrees/percent/units or less, within 6 degrees/percent/units or less, within 5 degrees/percent/units or less, within 4 degrees/percent/units or less, within 3 degrees/percent/units or less, within 2 degrees/percent/units or less, or within 1 degree/percent/unit or less. In some instances, "substantially" can include being within normal manufacturing tolerances.

Aspects herein can be embodied in other forms without departing from the spirit or essential attributes thereof. Accordingly, reference should be made to the following claims, rather than to the foregoing specification, as indicating the scope of the invention.

What is claimed is:
1. A vehicle comprising:
    a bed, the bed being defined in part by a first lateral side wall and a second lateral side wall, the first lateral side wall being spaced from and opposite to the second lateral side wall, at least one of the first lateral side wall and the second lateral side wall including:

an inner wall member;

an outer wall member; and a top protector, the top protector being operatively connected to the inner wall member and the outer wall member, the top protector defining a top surface of the first lateral side wall or the second lateral side wall, the inner wall member including a transverse portion, the transverse portion including an innermost end, the innermost end being substantially adjacent to an inner side of the top protector, whereby the inner wall member and outer wall member provide support across a width of the top surface, the inner wall member being substantially T-shaped in cross section.

2. The vehicle of claim 1, further including an accessory rail, wherein the accessory rail is a separate structure from the inner wall member, and wherein the accessory rail is operatively connected to the inner wall member.

3. The vehicle of claim 2, wherein the top protector includes a downturn side, and wherein an end of the downturn side is substantially adjacent to the accessory rail.

4. The vehicle of claim 1, further including an accessory rail, wherein the accessory rail and the inner wall member are a unitary structure.

5. The vehicle of claim 4, further including a connecting member that connects the accessory rail and the innermost end of the transverse portion of the inner wall member.

6. The vehicle of claim 1, wherein the inner wall member is made of an extruded material.

7. The vehicle of claim 6, wherein the inner wall member is made of aluminum.

8. The vehicle of claim 1, wherein the inner wall member is attached to the outer wall member, and wherein the inner wall member is attached to a structure that at least partially defines a floor structure of the bed.

9. The vehicle of claim 1, wherein the vehicle is a pick-up truck.

10. A vehicle comprising:

a bed, the bed being defined in part by a first lateral side wall and a second lateral side wall, the first lateral side wall being spaced from and opposite to the second lateral side wall, at least one of the first lateral side wall and the second lateral side wall including:

an inner wall member;

an outer wall member;

a top protector, the top protector being operatively connected to the inner wall member and the outer wall member, the top protector defining a top surface of the first lateral side wall or the second lateral side wall, the inner wall member including a transverse portion, the transverse portion including an innermost end, the innermost end being substantially adjacent to an inner side of the top protector, whereby the inner wall member and outer wall member provide support across a width of the top surface; and an accessory rail, the accessory rail and the inner wall member being formed together as a unitary structure.

* * * * *